United States Patent
Wang et al.

(10) Patent No.: US 10,120,260 B2
(45) Date of Patent: Nov. 6, 2018

(54) VIEWING ANGLE CONTROLLING LIGHT SOURCE DEVICE AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Chenru Wang, Beijing (CN); Xue Dong, Beijing (CN); Haiwei Sun, Beijing (CN); Ruijun Dong, Beijing (CN); Lu Yu, Beijing (CN); Lili Chen, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/541,978

(22) PCT Filed: Nov. 17, 2016

(86) PCT No.: PCT/CN2016/106243
§ 371 (c)(1),
(2) Date: Jul. 6, 2017

(87) PCT Pub. No.: WO2017/118224
PCT Pub. Date: Jul. 13, 2017

(65) Prior Publication Data
US 2017/0371225 A1 Dec. 28, 2017

(30) Foreign Application Priority Data
Jan. 8, 2016 (CN) .......................... 2016 1 0012359

(51) Int. Cl.
*G02F 1/29* (2006.01)
*H04N 13/04* (2006.01)
(Continued)

(52) U.S. Cl.
CPC .............. *G02F 1/29* (2013.01); *G02F 1/1323* (2013.01); *H04N 13/0404* (2013.01);
(Continued)

(58) Field of Classification Search
CPC .... G02F 1/29; G02F 1/1323; G02F 2001/291; G02F 2203/24; G02F 2203/58; G02F 2201/44; H04N 13/0404
See application file for complete search history.

(56) References Cited

U.S. PATENT DOCUMENTS

| | | | |
|---|---|---|---|
| 2009/0190048 A1 | 7/2009 | Hong et al. | |
| 2013/0271445 A1* | 10/2013 | Park | G09G 5/003 345/212 |
| 2014/0347615 A1 | 11/2014 | Oka et al. | |

FOREIGN PATENT DOCUMENTS

| CN | 101424808 A | 5/2009 |
|---|---|---|
| CN | 102141714 A | 8/2011 |

(Continued)

OTHER PUBLICATIONS

International Search Report and Written Opinion dated Feb. 28, 2017; PCT/CN2016/106243.

*Primary Examiner* — Kevin Quarterman
(74) *Attorney, Agent, or Firm* — Ladas & Parry LLP

(57) ABSTRACT

A viewing angle controlling light source device and a display apparatus are provided. The viewing angle controlling light source device includes a base substrate; a light emitting array arranged on the base substrate, wherein the light emitting array includes a plurality of light emitting units; at least one liquid crystal lens array arranged on the
(Continued)

light emitting array, wherein the liquid crystal lens array includes a plurality of liquid crystal lens units corresponding to the light emitting units one by one, each liquid crystal lens unit includes a first electrode and a second electrode, and a liquid crystal layer arranged between the first electrode and the second electrode, a light emergent direction of light emitted by the light emitting unit after the light transmitting through the liquid crystal lens unit by regulating a voltage difference between the first electrode and the second electrode.

21 Claims, 3 Drawing Sheets

(51) Int. Cl.
    *G02F 1/13*         (2006.01)
    *H04N 13/305*    (2018.01)

(52) U.S. Cl.
    CPC ..... *H04N 13/305* (2018.05); *G02F 2001/291* (2013.01); *G02F 2201/44* (2013.01); *G02F 2203/24* (2013.01); *G02F 2203/58* (2013.01)

(56) References Cited

FOREIGN PATENT DOCUMENTS

| | | |
|---|---|---|
| CN | 104777696 A | 7/2015 |
| CN | 205301770 U | 6/2016 |

\* cited by examiner

VIEWING ANGLE CONTROLLING LIGHT SOURCE DEVICE AND DISPLAY APPARATUS

TECHNICAL FIELD

Embodiments of the present disclosure relate to a viewing angle controlling light source device and a display apparatus.

BACKGROUND

A three-dimensional display, namely a 3D display technology, mainly obtains two images of a same object at different angles according to human vision, and the two images are respectively projected into a left eye and a right eye of a human, so that the images in the left eye and the right eye of the human have a certain parallax, a brain synthesizes a left eye image and a right eye image having parallax, which can generate depth perception, that is, a display effect of a three-dimensional image is formed.

A 3D display technology is mainly divided into two categories of an eyeglass type and a naked eye type. Special eyeglasses need to be worn for an eyeglass type 3D display technology, therefore, it is not conducive to the use of a portable equipment. A mobile electronic product pays more attention to a naked eye type 3D display technology. The naked eye 3D display technology is mainly divided into a cylindrical lens grating type and a slit grating type.

SUMMARY

A viewing angle controlling light source device of which the light emergent angle of the light source is adjustable and a display apparatus are provided in the embodiments of the present disclosure.

At least one embodiment of the present disclosure provides a viewing angle controlling light source device, and the viewing angle controlling light source device comprises: a base substrate; a light emitting array arranged on the base substrate, wherein the light emitting array comprises a plurality of light emitting units; and at least one liquid crystal lens array arranged on the light emitting array, wherein the liquid crystal lens array comprises a plurality of liquid crystal lens units corresponding to the light emitting units one by one; wherein each of the liquid crystal lens units comprises a first electrode disposed on a first base, a second electrode disposed on a second base, and a liquid crystal layer arranged between the first electrode and the second electrode; the first electrode and the second electrode are oppositely arranged; the first electrode and the second electrode are configured to apply voltages respectively; and each of the liquid crystal lens units is configured to adjust a light emergent direction of light emitted by the light emitting units after the light transmitting through the liquid crystal lens unit by regulating a voltage difference between the first electrode and the second electrode.

For example, in the viewing angle controlling light source device provided in one embodiment of the present disclosure, a plurality of liquid crystal lens arrays are arranged on the light emitting array.

For example, in the viewing angle controlling light source device provided in one embodiment of the present disclosure, the first electrode and the second electrode of the liquid crystal lens unit of each liquid crystal lens array are configured to generate a voltage difference, so that in a direction perpendicular to the base substrate, refractive indexes of the liquid crystal layers of the liquid crystal lens units of the plurality of liquid crystal lens arrays present gradient change.

For example, in the viewing angle controlling light source device provided in one embodiment of the present disclosure, a refractive index of a liquid crystal layer of a liquid crystal lens unit closer to a light emergent side is less than that of a liquid crystal layer of a liquid crystal lens unit farther away from the light emergent side.

For example, in the viewing angle controlling light source device provided in one embodiment of the present disclosure, the plurality of light emitting units comprise electroluminescence chips capable of emitting light of different wave lengths.

For example, in the viewing angle controlling light source device provided in one embodiment of the present disclosure, the electroluminescence chips capable of emitting light of different wave lengths comprise: a red light emitting chip, a green light emitting chip and a blue light emitting chip.

For example, in the viewing angle controlling light source device provided in one embodiment of the present disclosure, the plurality of light emitting units are white light emitting chips.

For example, in the viewing angle controlling light source device provided in one embodiment of the present disclosure, the base substrate is composed of a base made of glass or copper material, and graphene, gallium nitride or silicon material disposed on the base.

At least one embodiment of the present disclosure further provides a display apparatus, and the display apparatus comprises any one of the viewing angle controlling light source device of the embodiments of the present disclosure.

For example, the display apparatus provided in one embodiment of the present disclosure, further comprising a display module arranged on a side of the light emergent surface of the viewing angle controlling light source device.

For example, in the display apparatus provided in one embodiment of the present disclosure, the display module comprises a pixel array, and the pixel array comprises pixel units corresponding to the light emitting units one by one.

For example, in the display apparatus provided in one embodiment of the present disclosure, the plurality of light emitting units in the viewing angle controlling light source device comprises electroluminescence chips capable of emitting light of different wave lengths, and the display module comprises an array substrate and an opposed substrate which are oppositely arranged.

For example, in the display apparatus provided in one embodiment of the present disclosure, the plurality of light emitting units in the viewing angle controlling light source device are white light emitting chips, and the display module comprises an array substrate and a color film substrate which are oppositely arranged.

BRIEF DESCRIPTION OF THE DRAWINGS

In order to clearly illustrate technical solutions of the embodiments of the present disclosure, drawings in the embodiments will be introduced simply; and it is obvious that the described drawings just relate to some of the embodiments of the present disclosure, but are not limitative of the present disclosure.

REFERENCE NUMERALS

Figure 1:
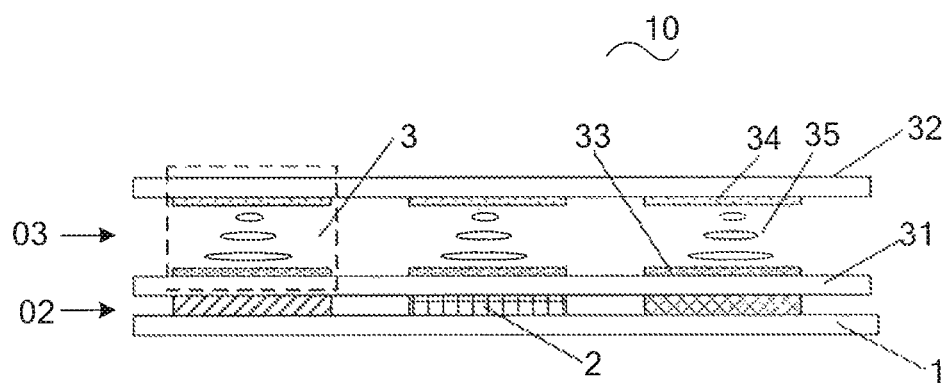
FIG. 1 is a schematic diagram of a viewing angle controlling light source device provided by an embodiment of the present disclosure.

10—viewing angle controlling light source device; 20—display module; 1—base substrate; 2—light emitting unit; 3—liquid crystal lens unit; 31—first base; 32—second base; 33—first electrode; 34—second electrode; 35—liquid crystal layer; 4—pixel unit; 201—array substrate of a display module; 202—opposed substrate of a display module; 203—lower polarizer; 204—upper polarizer; 031—first liquid crystal lens array; 032—second liquid crystal lens; 033—third liquid crystal lens array; 02—light emitting array; 03—liquid crystal lens array; 205—liquid crystal layer between the array substrate and the opposed substrate.

DETAILED DESCRIPTION

In order to make those skilled in the art better understand the technical solutions of the present disclosure, the present disclosure will be further described in detail in connection with the drawings and specific embodiments.

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the disclosure. Based on the embodiments in the disclosure, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "on," "under," "right," "left" and the like are only used to indicate relative position relationship, and when the position of the object which is described is changed, the relative position relationship may be changed accordingly.

The inventors find that at least following problems exist in the conventional technology: neither a viewing angle of light emitted by a backlight source used for performing 3D display nor a viewing angle of light emitted by a backlight source used for 2D display are adjustable, in at least one embodiment of the present disclosure, an orientating light source device whose viewing angle is adjustable for achieving switch between 2D display and 3D display is provided.

First Embodiment

As illustrated in FIG. 1, the present embodiment provides a viewing angle controlling light source device 10, and the viewing angle controlling light source device 10 comprises a base substrate 1, a light emitting array 02 arranged on the base substrate 1, and at least one liquid crystal lens array 03 arranged on the light emitting array 02. The light emitting array 02 comprises a plurality of light emitting units 2. The liquid crystal lens array 03 comprises a plurality of liquid crystal lens units 3 corresponding to the light emitting units 2 one by one. Each of the liquid crystal lens unit 3 comprises a first electrode 33 formed on a first base 31 and a second electrode 34 formed on a second base 32, and a liquid crystal layer 35 arranged between the first electrode 33 and the second electrode 34, the first electrode 33 and the second electrode 34 are oppositely arranged. That is, each of the liquid crystal lens unit 3 comprises a first base 31 and a second base 32 which are oppositely arranged, a surface of the first base 31 facing to the second base 32 is provided with a first electrode 33, a surface of the second base 32 facing to the first base 31 is provided with a second electrode 34, the first electrode 33 and the second electrode 34 are also oppositely arranged, and a liquid crystal layer 35 is arranged between the first electrode 33 and the second electrode 34. A light emergent direction of the light emitted by the light emitting unit 2 after the light transmitting through the liquid crystal lens unit 3 is adjusted by regulating the voltages applied to the first electrode 33 and the second electrode 34. That is, the first electrode 33 and the second electrode 34 are configured to apply voltages respectively, and each of the liquid crystal lens units is configured to adjust the light emergent direction of the light emitted by the light emitting units after the light transmitting through the liquid crystal lens unit by regulating values of the voltages (regulating a voltage difference between the first electrode and the second electrode) applied to the first electrode and the second electrode. For example, a reflective index of the liquid crystal layer 35 located between the first electrode 33 and the second electrode 34 is regulated by regulating the voltage difference between the first electrode 33 and the second electrode 34, and then the light emergent direction of the light emitted by the light emitting unit after the light transmitting through the liquid crystal lens unit is adjusted. The light emergent angle of the light source of the viewing angle controlling light source device 10 is adjustable.

For example, in the liquid crystal lens array, the refractive index of the liquid crystal layer 35 can change along with a change of a value of the voltage difference between the first electrode 33 and the second electrode 34.

For example, in the liquid crystal lens array, the liquid crystal layer 35 may be made of cholesteric liquid crystal, sematic liquid crystal or smectic liquid crystal. If the plurality of liquid crystal lens arrays 03 are stacked arranged, the different liquid crystal lens arrays 03 may be made of a same liquid crystal, or be made of various liquid crystal with different refractive indexes, which are not limited herein.

For example, in the liquid crystal lens array, both the first electrode 33 and the second electrode 34 are block-shaped electrodes, or one of the first electrode 33 and the second electrode 34 is a surface-shaped electrode, and the other one is a block-shaped electrode. It is only required that the light emergent direction of the light emitted by the light emitting unit after the light transmitting through the liquid crystal lens unit can be adjusted by regulating the voltage difference between the first electrode and the second electrode in the liquid crystal lens array.

Figure 2:
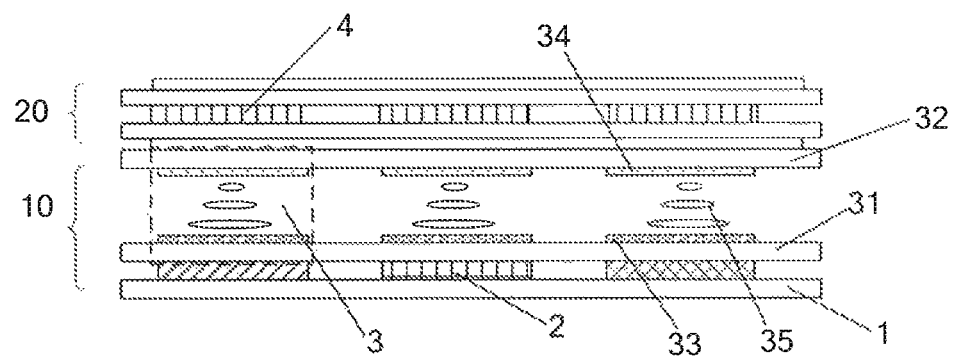
FIG. 2 is a schematic diagram of a display apparatus provided by an embodiment of the present disclosure.

For example, as illustrated in FIG. 2, the viewing angle controlling light source device 10 in the present embodiment is applied into a display apparatus, and the light emitting unit 2 on the base substrate 1 can be arranged corresponding to a corresponding pixel unit 4 in a display module 20, then adjusting the voltages applied on the first electrode 33 and the second electrode 34 of each liquid crystal lens unit 3 (regulating the voltage difference between the first electrode 33 and the second electrode 34), and controlling the deflection angle of the liquid crystal arranged between the first electrode 33 and the second electrode 34, so that a light emergent direction of the light of the light emitting unit 2 located below the liquid crystal lens unit 3 after the light transmitting through the liquid crystal lens unit 3 is controlled. That is to say, in a case that the display apparatus performs 3D display, a liquid crystal deflection direction of each liquid crystal lens unit 3 can be regulated, a light emergent direction of the light emitting unit 2 can be controlled, so that the light emitted by the light emitting unit 2 after the light transmitting the corresponding pixel unit 4 forms a left eye image and a right eye image, and finally the light reaches human eyes to form 3D display pictures. In a case that the display apparatus performs 2D display, no voltage is applied to the first electrode 33 and the second electrode 34 of the liquid crystal lens unit 3, and the light emitted by the light emitting unit 2 transmitted the liquid crystal lens unit 3 completely to achieve 2D display. The viewing angle controlling light source device 10 in the present embodiment can be applied to the switching of 2D display and 3D display of the display apparatus, and switching of a plurality of viewing angles is accurately achieved.

For example, the plurality of light emitting units 2 in the present embodiment comprise a plurality of electroluminescence chips which are capable of emitting light of different wave lengths. That is to say, the plurality of light emitting units 2 comprise a plurality of organic electroluminescence chips capable of emitting light of different colors, for example, the organic electroluminescence chips comprise a red light emitting chip, a green light emitting chip and a blue light emitting chip, and certainly may comprise organic electroluminescence chips of other colors, for example, a wine red light emitting chip, a yellow light emitting chip and the like. Adopting the viewing angle controlling light source device having the lighting emitting unit 2, the lighting emitting unit 2 and the pixel unit 4 having the corresponding color in the display module 20 are arranged correspondingly, and a color film in the display module 20 is omitted, so that the cost is reduced, and it is favor for the mass production of the display apparatus. It should be noted that, a size of the light emitting unit 2 is micron scale.

For example, in one example, the plurality of light emitting units 2 are white light emitting chips. Adopting the viewing angle controlling light source device 10 having the white light emitting chip, a color film is needed to be arranged in the display module 20, and therefore full color display is achieved.

For example, in one example, the base substrate 1 is composed of a base made of glass or copper material, and graphene, gallium nitride or silicon material arranged on the base. Of course, a corresponding material of the base substrate 1 can also be selected as required, which is not limited in the present embodiment.

For example, in the present embodiment, both the material of the first electrode 33 and the material of the second electrode 34 of the liquid crystal lens unit 3 are ITO (indium tin oxide) and other transparent conductive materials.

Second Embodiment

As illustrated in FIG. 2, the present embodiment provides a display apparatus, the display apparatus comprises the viewing angle controlling light source device 10 in the first embodiment, and thus the display apparatus in the present embodiment can achieve switching between 2D display and 3D display.

For example, a display module 20 is arranged on a light emergent surface side of the viewing angle controlling light source device 10 in the display apparatus of the present embodiment, the display module 20 comprises a pixel array, the pixel array comprises a plurality of pixel units 4, and the pixel units 4 correspondence with the light emitting units 2 one by one.

Figure 3:
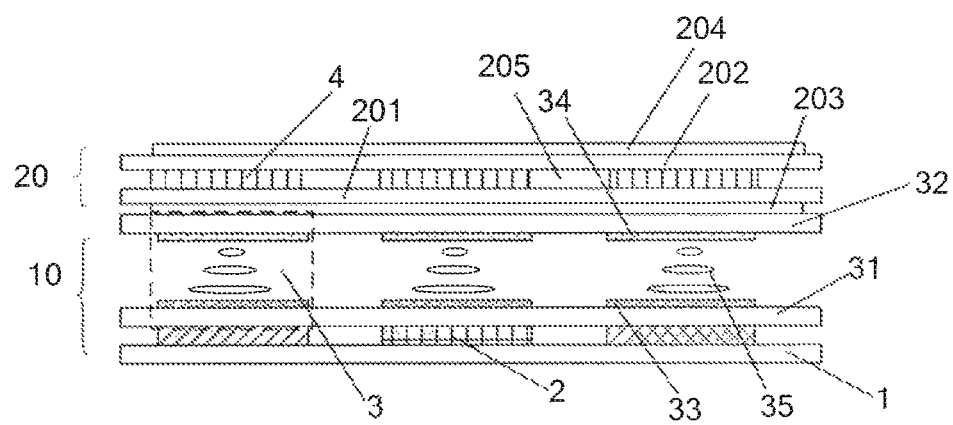
FIG. 3 is a schematic diagram of another display apparatus provided by an embodiment of the present disclosure.

It should be noted that, the display module 20 may be a liquid crystal display module, as illustrated in FIG. 3, polarizers (a lower polarizer 203 and an upper polarizer 204) are arranged on a light entrance surface side and a light emergent surface side of the display module 20, and the structure of the display module is same as that in the conventional technology, and detailed descriptions will be omitted here.

As a specific structure of the display apparatus of the present embedment, as illustrated in FIG. 3, the plurality of light emitting units 2 in the viewing angle controlling light source device 10 comprise a plurality of electroluminescence chips which are capable of emitting light of different wave lengths. That is to say, the plurality of light emitting units 2 comprise a plurality of organic electroluminescence chips capable of emitting light of different colors, for example, the organic electroluminescence chips comprise a red light emitting chip, a green light emitting chip and a blue light emitting chip, and certainly may comprise organic electroluminescence chips of other colors, for example, a wine red light emitting chip, a yellow light emitting chip and the like. Adopting the viewing angle controlling light source device having the lighting emitting unit 2, the lighting emitting unit 2 and the pixel unit 4 having the corresponding color in the display module 20 are arranged correspondingly, and a color film in the display module 20 is omitted, so that the cost is reduced, and it is favor for the mass production of the display apparatus. In this case, the display module 20 arranged on the light emergent surface side of the viewing angle controlling light source device 10 comprises an array substrate 201 and an opposed substrate 202 which are oppositely arranged, and a liquid crystal layer 205 arranged between the array substrate 201 and the opposed substrate 202.

As a structure of another example of the display apparatus of the present embodiment, the plurality of light emitting units 2 in the viewing angle controlling light source device 10 are white light emitting chips, in this case, the display module 20 arranged on the light emergent surface side of the viewing angle controlling light source device 10 comprises an array substrate 201 and an opposed substrate 202 which are oppositely arranged, and a liquid crystal layer 205 arranged between the array substrate 201 and the opposed substrate 202, and the opposed substrate 202 may be a color film substrate.

Figure 4:
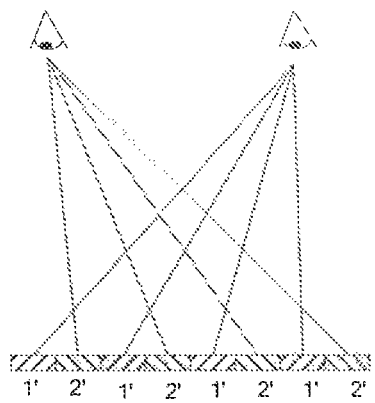
FIG. 4 is a schematic diagram of a display apparatus performing 3D display provided by an embodiment of the present disclosure.

FIG. 4 illustrates a schematic diagram in a case that the display apparatus performs 3D display, a left eye and a right eye respectively correspond to sub-pixels corresponding to 2' and 1' in FIG. 4. The light emergent direction of the light emitted by the light emitting unit 2 after the light transmitting through the liquid crystal lens unit 3 is adjusted by adjusting the difference value of the voltages applied on the first electrode 33 and the second electrode 34 to achieve 3D display. For example, one liquid crystal lens unit corresponds to one sub-pixel, which is not limited herein.

In FIGS. 1 to 3, taking the viewing angle controlling light source device 10 comprises one liquid crystal lens array for example, but the viewing angle controlling light source device 10 may further comprise a plurality of liquid crystal lens arrays, and the plurality of liquid crystal lens arrays may be sequentially stacked. In a case that one liquid crystal lens array is arranged, a deflection effect of one liquid crystal layer on the light may be limited. In a case that a number of stacked liquid crystal lens arrays are arranged, the controllability becomes stronger, and the deflection effect of the light is improved.

Figure 5:
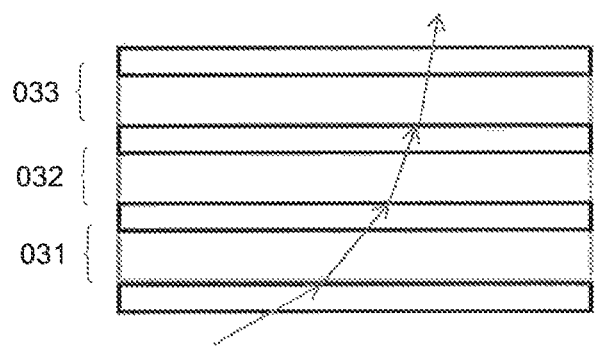
FIG. 5 is a schematic diagram of a light path of one sub-pixel in a case that the viewing angle controlling light source device provided by an embodiment of the present disclosure comprises a plurality of liquid crystal lens arrays.

As illustrated in FIG. 5, the viewing angle controlling light source device 10 comprises a first liquid crystal lens array 031, a second liquid crystal lens array 032 and a third liquid crystal lens array 033, and taking the viewing angle controlling light source device 10 for example. For example, as for one sub-pixel, by adjusting the voltage difference between the first electrode 33 and the second electrode 34 of each liquid crystal array, refractive indexes of the liquid crystal layers of the liquid crystal lens units of the plurality of liquid crystal lens arrays can present gradient change. Thus, a refractive index of a liquid crystal layer between the first electrode and the second electrode can be controlled by adjusting the difference value of the voltages of the first electrode and the second electrode of each liquid crystal lens unit, heterogeneous distribution of a gradient change of an optical refractive index is illustrated as an entire, so that the light emergent direction of the light of the light emitting unit located below the liquid crystal lens unit after the light transmitting through the liquid crystal lens unit is controlled. For example, under a condition of power on, a refractive index of the liquid crystal layer of the liquid crystal lens unit 3 of the first liquid crystal lens array 031 is n1, a refractive index of the liquid crystal layer of the liquid crystal lens unit 3 of the second liquid crystal lens array 032 is n2, and a refractive index of the liquid crystal layer of the liquid crystal lens unit 3 of the third liquid crystal lens array 033 is n3. For example, n1 is larger than n2 which is larger than n3. For example, the refractive index of the liquid crystal layer of the liquid crystal lens unit closer to the light emergent side is less than that of the liquid crystal layer of the liquid crystal lens unit farther away from the light emergent side. For example, every two adjacent stacked liquid crystal lens arrays can share a base, so that a thickness of the viewing angle controlling light source device 10 is reduced. For example, n+1 bases can be adopted for n liquid crystal lens arrays. For example, the reflective index of the liquid crystal layer refers to the refractive index of ordinary light (O light), which is not limited herein.

For example, on the premise of calculating what angle light needs to deflect, by arranging the voltage difference between the first electrode and the second electrode, the refractive index of the liquid crystal layer between the first electrode and the second electrode can be controlled, so that a refractive angle of the light is affected, and finally, emergent at a needed light direction angle is achieved. Because distribution of light of light emitting chips follows Gaussian distribution, it means that in a certain direction the light is distributed most, in this way, the liquid crystal lens array can orientate most light in the range of this direction. For the light exceeding the direction range, the incident angle of the light is large, a total reflection phenomenon may be occurred in a case that the light transmits in the liquid crystal lens, and the light cannot be transmitted out. Thus, orientation of light transmitting the viewing angle controlling light source device 10 is achieved.

Figure 6:
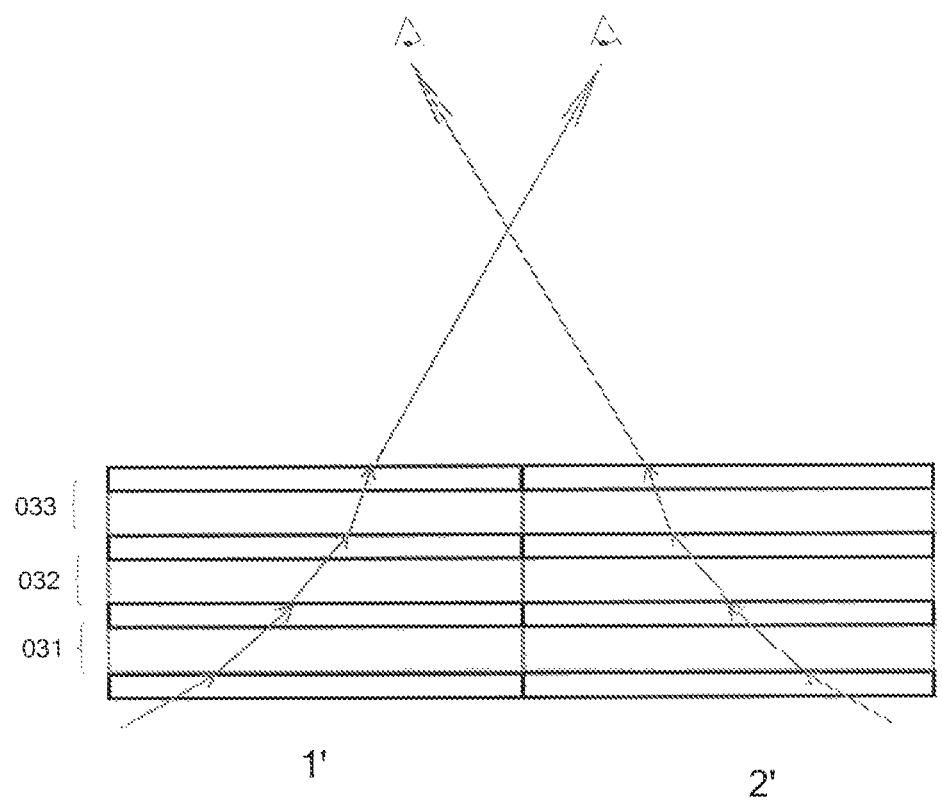
FIG. 6 is a schematic diagram of light paths of two sub-pixels at different viewing angles in a case that the viewing angle controlling light source device provided by an embodiment of the present disclosure comprises a plurality of liquid crystal lens arrays.

FIG. 6 illustrates a schematic diagram of light paths of two sub-pixels in different viewing angles and respectively corresponding to a left eye and a right eye. Light paths of other sub-pixels can refer to FIG. 6.

For example, in the embodiment of the present disclosure, the electroluminescence chips, for example, comprises light emitting diodes, and the display apparatus, for example, comprises a liquid crystal display apparatus or a light emitting diode display apparatus. For example, in a case that the light emitting unit illustrated in FIG. 1 is a light emitting diode display panel, a structure illustrated in FIG. 1 is a light emitting diode display apparatus.

At least one embodiment of the present disclosure has the following advantages:

The viewing angle controlling light source device provided by the embodiment of the present disclosure is applied into a display apparatus, and the light emitting unit on the base substrate can be arranged corresponding to a corresponding pixel unit in a display module, then adjusting the voltages applied on the first electrode and the second electrode of each liquid crystal lens unit, and controlling the deflection angle of the liquid crystal arranged between the first electrode and the second electrode, so that a light emergent direction of the light of the light emitting unit located below the liquid crystal lens unit after the light transmitting through the liquid crystal lens unit is controlled. That is to say, in a case that the display apparatus performs 3D display, a liquid crystal deflection direction of each liquid crystal lens unit can be regulated, a light emergent direction of the light emitting unit can be controlled, so that the light emitted by the light emitting unit after the light transmitting the corresponding pixel unit forms a left eye image and a right eye image, and finally the light reaches human eyes to form 3D display pictures. In a case that the display apparatus performs 2D display, no voltage is applied to the first electrode and the second electrode of the liquid crystal lens unit, and the light emitted by the light emitting unit transmitted the liquid crystal lens unit completely to achieve 2D display. The viewing angle controlling light source device in the present embodiment can be applied to the switching of 2D display and 3D display of the display apparatus, and switching of a plurality of viewing angles is accurately achieved.

What are described above is related to the illustrative embodiments of the disclosure only and not limitative to the scope of the disclosure. For those skilled in the art who are familiar with the technical field, any changes or modifications are easy to be envisaged in the technical scale disclosed in the present disclosure are within the scope of the claims of the present disclosure. Therefore, the scopes of the disclosure are defined by the accompanying claims.

The present application claims priority of Chinese Patent Application No. 201610012359.X filed on Jan. 8, 2016, the disclosure of which is incorporated herein by reference in its entirety as part of the present application.

What is claimed is:

1. A viewing angle controlling light source device, comprising:
    a base substrate;
    a light emitting array arranged on the base substrate, wherein the light emitting array comprises a plurality of light emitting units; and
    at least one liquid crystal lens array arranged on the light emitting array, wherein the liquid crystal lens array comprises a plurality of liquid crystal lens units corresponding to the light emitting units one by one; wherein each of the liquid crystal lens units comprises a first electrode disposed on a first base, a second electrode disposed on a second base, and a liquid crystal layer arranged between the first electrode and the second electrode; the first electrode and the second electrode are oppositely arranged; the first electrode and the second electrode are configured to apply voltages respectively; and each of the liquid crystal lens units is configured to adjust a light emergent direction of light emitted by the light emitting units after the light transmitting through the liquid crystal lens unit by regulating a voltage difference between the first electrode and the second electrode.

2. The viewing angle controlling light source device according to claim 1, wherein a plurality of liquid crystal lens arrays are arranged on the light emitting array.

3. The viewing angle controlling light source device according to claim 2, wherein the first electrode and the second electrode of the liquid crystal lens unit of each liquid crystal lens array are configured to generate a voltage difference, so that in a direction perpendicular to the base substrate, refractive indexes of the liquid crystal layers of the liquid crystal lens units of the plurality of liquid crystal lens arrays present gradient change.

4. The viewing angle controlling light source device according to claim 3, wherein a refractive index of a liquid crystal layer of a liquid crystal lens unit closer to a light emergent side is less than that of a liquid crystal layer of a liquid crystal lens unit farther away from the light emergent side.

5. The viewing angle controlling light source device according to claim 1, wherein the plurality of light emitting units comprise electroluminescence chips capable of emitting light of different wave lengths.

6. The viewing angle controlling light source device according to claim 5, wherein the electroluminescence chips capable of emitting light of different wave lengths comprise: a red light emitting chip, a green light emitting chip and a blue light emitting chip.

7. The viewing angle controlling light source device according to claim 1, wherein the plurality of light emitting units are white light emitting chips.

8. The viewing angle controlling light source device according to claim 1, wherein the base substrate is composed of a base made of glass or copper material, and graphene, gallium nitride or silicon material disposed on the base.

9. A display apparatus, comprising the viewing angle controlling light source device according to claim 1.

10. The display apparatus according to claim 9, further comprising a display module arranged on a side of the light emergent surface of the viewing angle controlling light source device.

11. The display apparatus according to claim 10, wherein the display module comprises a pixel array, and the pixel array comprises pixel units corresponding to the light emitting units one by one.

12. The display apparatus according to claim 10, wherein the plurality of light emitting units in the viewing angle controlling light source device comprise electroluminescence chips capable of emitting light of different wave lengths, and
    the display module comprises an array substrate and an opposed substrate which are oppositely arranged.

13. The display apparatus according to claim 10, wherein the plurality of light emitting units in the viewing angle controlling light source device are white light emitting chips, and
    the display module comprises an array substrate and a color film substrate which are oppositely arranged.

14. The viewing angle controlling light source device according to claim 2, wherein the plurality of light emitting units comprise electroluminescence chips capable of emitting light of different wave lengths.

15. The viewing angle controlling light source device according to claim 3, wherein the plurality of light emitting units comprise electroluminescence chips capable of emitting light of different wave lengths.

16. The viewing angle controlling light source device according to claim 4, wherein the plurality of light emitting units comprise electroluminescence chips capable of emitting light of different wave lengths.

17. The viewing angle controlling light source device according to claim 2, wherein the plurality of light emitting units are white light emitting chips.

18. The viewing angle controlling light source device according to claim 3, wherein the plurality of light emitting units are white light emitting chips.

19. The viewing angle controlling light source device according to claim 2, wherein the base substrate is composed of a base made of glass or copper material, and graphene, gallium nitride or silicon material disposed on the base.

20. The viewing angle controlling light source device according to claim 3, wherein the base substrate is composed of a base made of glass or copper material, and graphene, gallium nitride or silicon material disposed on the base.

21. The viewing angle controlling light source device according to claim 1, wherein the liquid crystal layer is made of cholesteric liquid crystal, nematic liquid crystal or smectic liquid crystal.

* * * * *